June 23, 1931.　　　W. H. DELAHAYE　　　1,811,539
BRAKE
Filed May 1, 1929
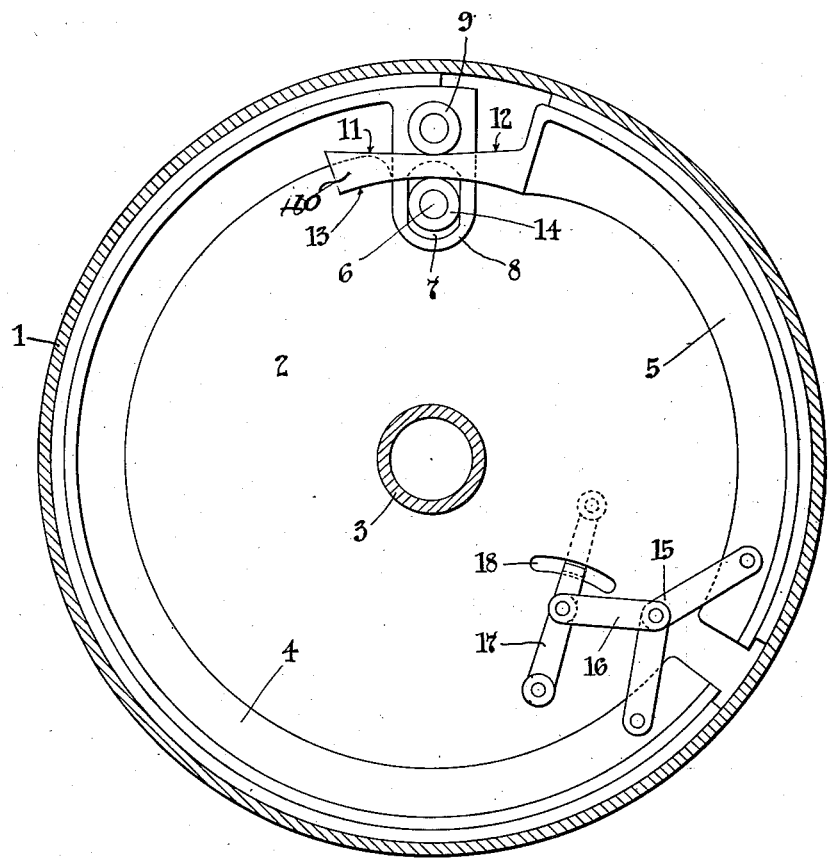
INVENTOR:
WALTER HAMILTON DELAHAYE.
BY　　　　　ATTORNEY Patented June 23, 1931

1,811,539

UNITED STATES PATENT OFFICE

WALTER HAMILTON DELAHAYE, OF OTTAWA, ONTARIO, CANADA, ASSIGNOR TO BENDIX BRAKE COMPANY, OF SOUTH BEND, INDIANA

BRAKE

Application filed May 1, 1929. Serial No. 359,448.

This invention relates to improvements in brakes and specifically to those automobile brakes which are known as self-energizing or servo brakes.

One object of the invention is to apply the servo principle to two shoe brakes. Another object is to have a construction which will have a good braking effect even when the drum is not rotating. Still another object is to accomplish the above objects and obtain at the same time a servo action regardless of the direction of the rotation of the drum.

These objects are accomplished by the mechanism shown in the accompanying drawing and described in the specification appended hereto.

Referring to the drawing, which shows, by way of example, a brake in elevation, the shoes being shown applied, but in the position occupied prior to any servo action, 1 represents a brake drum, 2 the fixed flange on the axle 3, 4 a main shoe and 5 the servo shoe. The main shoe is of practically standard construction except that it is anchored to the pivot 6 by a slot 7 in the terminal lug 8 of the shoe. It also carries a roller 9 pivoted thereon in the same radial plane as the pivot 6. The servo shoe 5 which occupies the major portion of the arc not occupied by the main shoe has an extension 10 which presents an outer surface made up of two oppositely outwardly inclined surfaces 11 and 12. The inner side of the extension 10 has a surface 13 preferably concentric with the brake axis adapted to engage the roller 14 carried on the fixed pivot 6. The free ends of both shoes are connected by a toggle 15 which is linked at 16 to an operating lever 17. This lever passes through a slot 18 in the support 2 where it may be attached to the customary brake rod. The toggle and applying lever are shown by way of example only, and any other equivalent means may be employed.

The operation of the device will be readily understood. Operation of the lever 17 applies both shoes and if the drum 1 is at rest an effective braking effort is obtained. This is augmented if there is any relative movement between the drum and the shoes. The servo shoe, due to its mountings, is free to move with the drum. This will result in the anchored end of the shoe being forced out by the inclines 11 or 12 depending on the direction of rotation. Thus a powerful servo action takes place which varies according to the speed of rotation of the drum.

In the drawing all return springs, stops and adjusting devices have been omitted as these may be constructed in any of the ways known to those skilled in the art.

Various modifications may be made in the details of the invention, but it is the intention to cover the device in its broader aspect and all such modifications as shall fall within the scope of the appended claims.

What I claim is:

1. In a brake and in combination with a fixed support, an anchor on said support, a shoe mounted for limited radial movement on said anchor, a servo shoe, means connecting the adjacent ends of said shoes for urging them into engagement with a brake drum, the other end of said servo shoe lying outside the anchor and bearing against the shoe anchored thereon.

2. In a brake as claimed in claim 1, said anchor carrying a roller to engage said servo shoe and said first mentioned shoe an abutment to engage the servo shoe, said abutment and roller being in substantially the same radial plane.

3. In a brake as claimed in claim 1, said anchor carrying a roller, said servo shoe having an extension, having a double cam exterior surface and an abutment on said first mentioned shoe engaging said cam.

4. In a brake as claimed in claim 1, a roller on said anchor, a roller on said anchored shoe in substantially the same radial plane as the anchor, said servo brake having an extension presenting a contacting surface to said first mentioned roller and a double outwardly diverging cam surface to said roller carried by said shoe.

5. In a brake and in combination with a fixed support, a pair of brake shoes, an anchor slidably supporting said shoes, one having a limited radial movement and the other a circumferential movement, means carried by said shoes to cause the circumferential movement of the one to produce the radial movement of the other, and means to apply the free ends of the shoes to a brake drum.

6. In a brake as claimed in claim 5, said means consisting of a roller on one shoe and a double cam surface on the other shoe.

7. In a brake as claimed in claim 5, the circumferentially moving shoe having a surface concentric to the axis of the brake, said surfaces engaging the anchor, said shoes having a cam and roller engagement with each other.

8. A brake comprising a support, an anchor secured thereto, a shoe radially slidable on the anchor having a projection adjacent the anchor and a servo shoe having an extension forming a cam slidably positioned between the anchor and the projection.

9. A brake comprising a support, an anchor secured thereto, a shoe radially slidable on the anchor and a servo shoe having an extension forming a cam slidably positioned between the anchor and the anchored shoe.

10. A brake comprising a support, an anchor secured thereto, a shoe radially slidable on the anchor, and a servo shoe having an extension forming a cam with two spaced operative faces, said extension being slidably positioned between the anchor and the anchored shoe.

11. A brake comprising a radially slidable anchored shoe, and a servo shoe having an extension forming a cam slidably engaging the anchored shoe and adapted to radially move the same.

12. A brake comprising a radially slidable anchored shoe and a servo shoe, said shoes having a connection at the free end of the anchored shoe adapted to circumferentially spread the shoes, and said servo shoe having an extension slidably contacting the anchored end of the other shoe adapted to radially move the same.

13. A brake comprising a radially slidable anchored shoe and a servo shoe, said shoes having a connection at the free end of the anchored shoe adapted to circumferentially spread the shoes, and said servo shoe having an extension slidably contacting the anchored end of the other shoe adapted to outwardly move the same by circumferential movement in either direction.

In testimony whereof I have affixed my signature.

WALTER HAMILTON DELAHAYE.

CERTIFICATE OF CORRECTION.

Patent No. 1,811,539.  June 23, 1931.

WALTER HAMILTON DELAHAYE.

It is hereby certified that error appears in the printed specification of the above numbered patent requiring correction as follows: Page 1, line 86, claim 3, after "mentioned" insert the word brake; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.